(12) United States Patent
Lin et al.

(10) Patent No.: US 7,551,228 B2
(45) Date of Patent: Jun. 23, 2009

(54) AUDIO-VIDEO SIGNAL TRANSCEIVING PROCESSING DEVICE

(75) Inventors: Yung-Da Lin, Jhonghe (TW); Ming-Hou Dai, Jhonghe (TW)

(73) Assignee: Avermedia Technologies, Inc., Taipei Hsien (TW)

( * ) Notice: Subject to any disclaimer, the term of this patent is extended or adjusted under 35 U.S.C. 154(b) by 1259 days.

(21) Appl. No.: 10/797,291

(22) Filed: Mar. 10, 2004

(65) Prior Publication Data

US 2005/0183014 A1   Aug. 18, 2005

(30) Foreign Application Priority Data

Feb. 18, 2004   (TW) .............................. 93103998 A

(51) Int. Cl.
*H04N 11/00*   (2006.01)
*H04N 5/44*    (2006.01)
*H04N 3/27*    (2006.01)

(52) U.S. Cl. ..................... 348/552; 348/553; 348/554; 715/718

(58) Field of Classification Search ................. 348/441, 348/552, 725, 553, 714, 716, 720; 715/718; 710/5, 20; 712/33–36
See application file for complete search history.

(56) References Cited

U.S. PATENT DOCUMENTS

| | | | |
|---|---|---|---|
| 5,630,174 A | 5/1997 | Stone, III et al. ............ 395/883 |
| 5,642,139 A | 6/1997 | Eglit et al. ................. 345/202 |
| 5,912,676 A | 6/1999 | Malladi et al. | |
| 6,023,266 A | 2/2000 | Eglit et al. ................. 345/202 |
| 6,081,533 A * | 6/2000 | Laubach et al. ............. 370/421 |
| 6,427,194 B1 | 7/2002 | Owen et al. | |
| 6,546,426 B1 | 4/2003 | Post | |
| 6,591,419 B2 * | 7/2003 | Barry et al. .................... 725/25 |
| 6,792,577 B1 * | 9/2004 | Kimoto ....................... 715/235 |
| 6,804,300 B1 * | 10/2004 | Hoshino et al. .......... 375/240.1 |
| 6,816,750 B1 * | 11/2004 | Klaas ......................... 700/121 |
| 6,912,557 B1 * | 6/2005 | North et al. ................. 708/490 |
| 7,099,295 B1 * | 8/2006 | Doyle et al. ................. 370/338 |
| 7,143,201 B2 * | 11/2006 | Watanuki ..................... 710/11 |
| 7,146,130 B2 * | 12/2006 | Hsu et al. ................... 455/3.04 |
| 7,307,667 B1 * | 12/2007 | Yeh et al. .................... 348/555 |
| 2002/0059481 A1 * | 5/2002 | Nunally ......................... 710/5 |
| 2003/0192950 A1 | 10/2003 | Muterspaugh ......... 235/472.01 |
| 2006/0095615 A1 * | 5/2006 | Kim et al. ..................... 710/62 |

(Continued)

FOREIGN PATENT DOCUMENTS

EP   0954174   11/1999

(Continued)

*Primary Examiner*—Victor R Kostak
(74) *Attorney, Agent, or Firm*—Thomas, Kayden, Horstemeyer & Risley

(57) ABSTRACT

An audio-video (AV) signal transceiving processing device which includes a AV decoder, a bridge, and a bus interface, wherein the bus interface is a PCMCIA, CardBus, or Express Card bus interface. The AV decoder is used to receive an analog video signals and a corresponding analog audio signal, and output a first digital video signal and a corresponding first digital audio signal. The bridge is used to receive the first digital video signal and the first digital audio signal, and output a second digital video signal and a second digital audio signal, which are compliant to a bus interface standard, to a computer through a bus interface that is compliant to the bus interface standard.

19 Claims, 2 Drawing Sheets

U.S. PATENT DOCUMENTS

2006/0161960 A1* 7/2006 Benoit ................. 725/105
2006/0293100 A1* 12/2006 Walter ................. 463/30

FOREIGN PATENT DOCUMENTS

| JP | 8211978 | 8/1996 |
| JP | 2002051277 | 2/2002 |
| KR | 2001068517 | 7/2001 |
| WO | WO 93/15453 | 8/1993 |
| WO | WO 95/30308 | 11/1995 |

* cited by examiner

AUDIO-VIDEO SIGNAL TRANSCEIVING PROCESSING DEVICE

This application claims the benefit of Taiwan application Serial No. 93103998, filed Feb. 18, 2004, the subject matter of which is incorporated herein by reference.

BACKGROUND OF THE INVENTION

1. Field of the Invention

The invention relates in general to a type of audio-video signal transceiving processing device and more particularly to a type of audio-video signal transceiving processing device that decodes received analog video signals and analog audio signals into digital video signals and digital audio signals and outputs them to the computer.

2. Description of the Related Art

In technology advanced era nowadays, computers have become an indispensable part of the everyday life of modern people. Because computers can only play digital audio-video (AV) signals, analog signals from television (TV) stations can not be played directly on computers. Therefore, some manufactures developed AV signal transceiving processing devices which can transform the analog signals into digital signals that can be played on computers.

Widely used AV signal transceiving processing devices nowadays are TV tuner cards, which are also called TV capture cards. The user can view the television signal on the computer monitor by having a TV tuner card. However, ordinary TV tuner cards have PCI interface. They are mainly used in desktop personal computers (PCs), and do not support hot plug. In the other hand, a new type of TV tuner cards have CardBus bus interface, and are mainly used in laptop PCs (as shown in FIG. 1). They do support hot plug, but they use hardware encoding method to process signals, therefore require more hardware components and have higher cost.

Please refer to FIG. 1 which is a circuit block diagram of traditional AV signal transceiving processing device. In FIG. 1, AV signal transceiving processing device 10 includes a video & audio encoder (AV encoder) 18, a CardBus bus interface 13, a video decoder 11, an audio decoder 16, a tuner 15, a multiplexer 17, and an audio analog-to-digital converter (ADC) 12. Wherein, the audio decoder 11 can be Philips SAA7113 decoder, the audio ADC 12 can be AKM5355 analog-to-digital converter, and the AV encoder 18 can be Fujitsu MB86393A Mpeg2 encoder. In addition, the tuner 15 can be Sony's tuner, and the audio decoder 16 can be AN5833 SAP decoder.

The tuner 15 is used to receive an analog TV AV signal T, and output an analog video signal Va, and an analog audio medium frequency signal Aa. The video decoder 11 is used to receive analog video signal Va, and output a digital video signal Vd to the AV encoder 18 accordingly. The audio decoder 16 is used to receive and decode an analog audio medium frequency signal Aa. Then, audio decoder 16 outputs an analog right channel audio signal AaR1 and an analog left channel audio signal AaL1 to the multiplexer 17.

The video decoder 11 can receive an analog signal from a video cassette recorder (VCR) such as an analog S video signal Vas or an analog V video signal Vav. The multiplexer 17 can receive an analog right channel audio signal AaR2 and an analog left channel audio signal AaL2, which correspond to the analog S video signal Vas and the analog V video signal Vav respectively, from the VCR. Video decoder 11 can receive the analog S video signal Vas or the analog V video signal Vav, and output a digital S video signal Vds or a digital V video signal Vdv accordingly. The multiplexer 17 outputs an analog right channel audio signal AaR and an analog left channel audio signal AaL, according to the analog right channel audio signal AaR1 and the analog left channel audio signal AaL1, or the analog right channel audio signal AaR2 and the analog left channel audio signal AaL2, to audio ADC 12. The audio ADC 12 is used to receive the analog right channel audio signal AaR and analog left channel audio signal AaL, and output a digital audio signal Ad to the AV encoder 18 accordingly.

The AV encoder 18 receives and encodes the digital video signal Vd and digital audio signal Ad, and outputs a digital AV signal X, for example a Mpeg2 AV signal, accordingly. Furthermore, the AV encoder 18 can receive and encode the digital audio signal Ad, the digital S video signal Vds or the digital V video signal Vdv, and output another digital AV signal Y, for example another Mpeg2 AV signal, accordingly. The AV encoder 18 transfers the digital AV signal X or Y to a computer 14, for example a laptop computer, through a Card-Bus bus interface 13. At this moment, the computer 14 can store or play the digital AV signal X or Y.

From the description above, it can be known that the AV signal transceiving processing device 10 must use several hardware components including the video decoder 11, the audio decoder 16, the audio ADC 12 and the AV encoder 18, to encode raw data, such as analog AV video signals and analog audio signals, into digital AV signals and output the digital AV signals to the computer 14. However, because the number of required hardware components is high, and the source of different components are different, the cost of the AV signal transceiving processing device 10 is relatively high.

SUMMARY OF THE INVENTION

It is therefore an object of the invention to provide an audio-video (AV) signal transceiving processing device. The invention's design, which decodes received analog video signals and analog audio signals into digital video signals and digital audio signals and outputs them to the computer, fully exploits PCMCIA, CardBus, and Express Card's high data transmission ability for raw data, such as digital video signals, digital audio signals, digital AV signals and digital broadcasting signals, and computer's high computational power to encodes digital video and audio signals into digital AV signals. Consequently, the number of hardware components required is reduced, and hence the manufacturing cost is decreased.

The invention achieves the above-identified object by providing an audio-video (AV) signal transceiving processing device which includes a AV decoder, a bridge, and a bus interface, wherein the bus interface is a PCMCIA, CardBus, or Express Card bus interface. The AV decoder is used to receive an analog video signals and a corresponding analog audio signal, and output a first digital video signal and a corresponding first digital audio signal accordingly. The bridge is used to receive the first digital video signal and the first digital audio signal, and output a second digital video signal and a second digital audio signal, which are compliant to a bus interface standard, to a computer through a bus interface that is compliant to the bus interface standard.

The invention achieves another object by providing an audio-video (AV) signal transceiving processing device which includes a bridge and a bus interface, wherein the bus interface is a PCMCIA, CardBus, or Express Card bus interface. The bridge is used to receive a first digital video signal and a first digital audio signal, and convert the received signals into a second digital video signal and a second digital audio signal, which are compliant to a bus interface standard. Then, the bridge outputs the second digital video signal and the second digital audio signal to a computer through a bus interface that is compliant to the bus interface standard.

The invention achieves another object by providing an audio-video (AV) signal transceiving processing device which includes a bridge and a bus interface, wherein the bus interface is a PCMCIA, CardBus, or Express Card bus interface. The bridge is used to receive the first digital broadcasting signal, and convert the received signal into a second digital broadcasting signal, which is compliant to a bus interface standard. Then, the bridge outputs the second digital broadcasting signal to a computer through a bus interface that is compliant to the bus interface standard.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
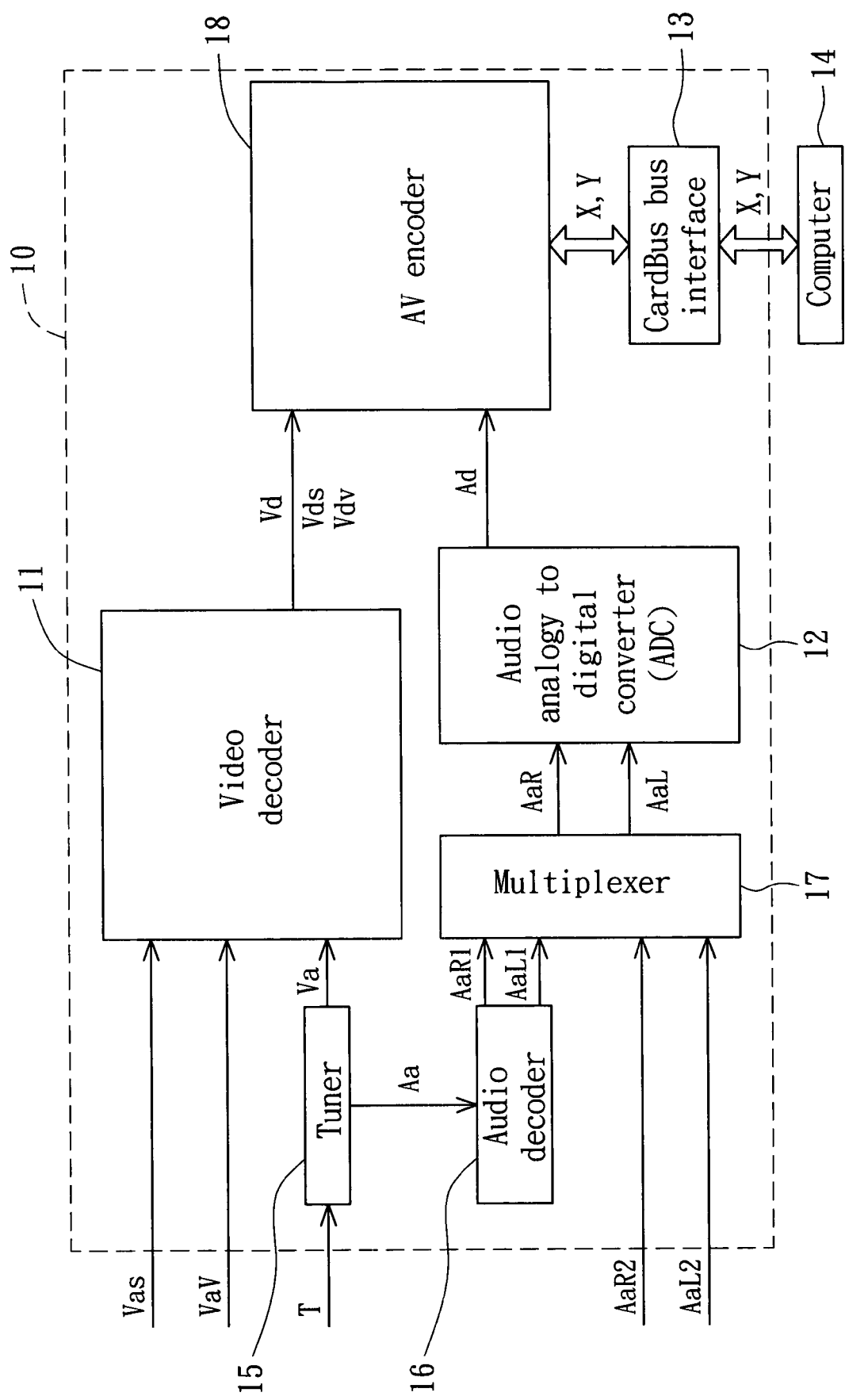
FIG. 1 (Prior Art) is a circuit block diagram showing a conventional audio-video signal transceiving processing device.
Figure 2:
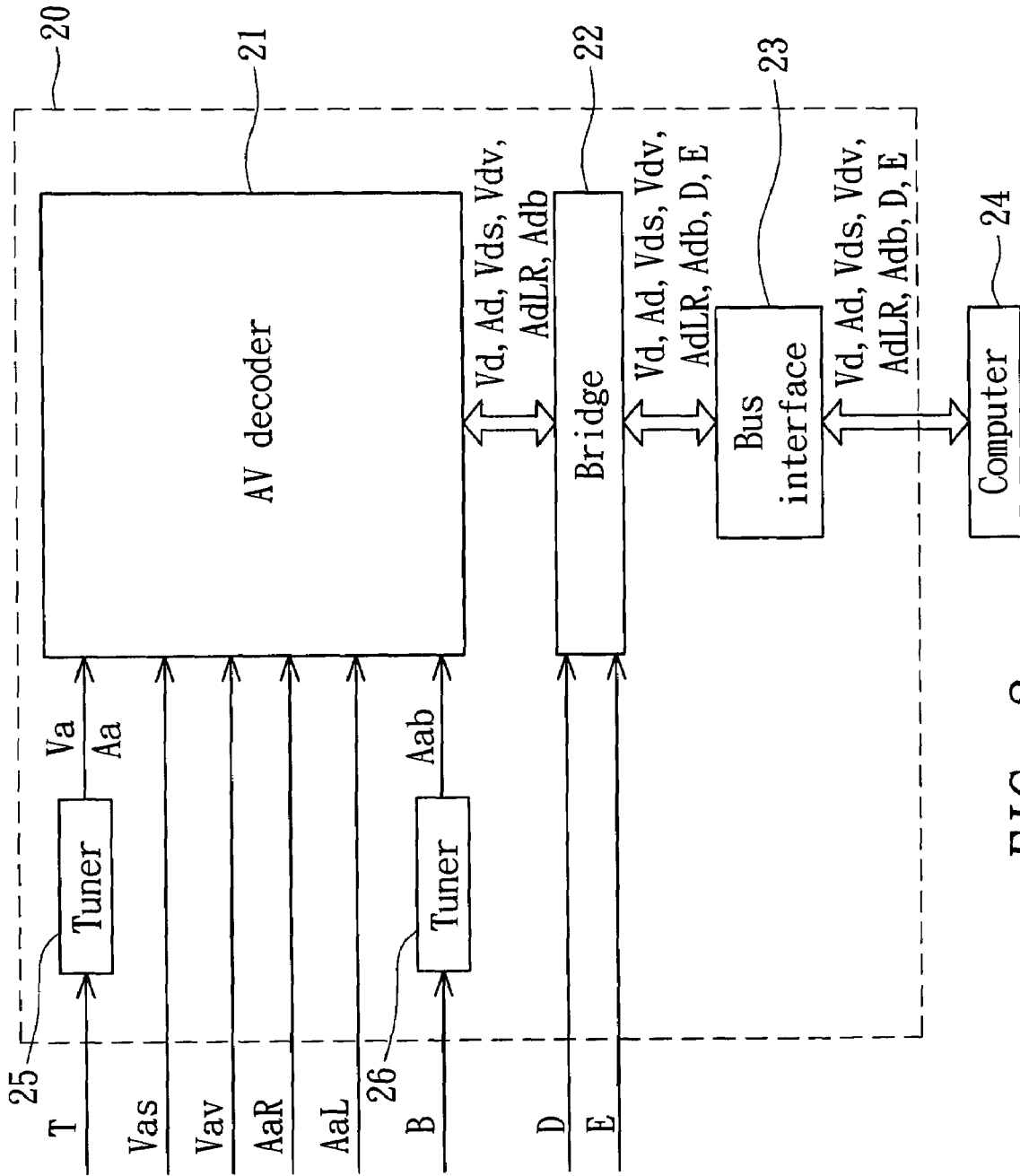
FIG. 2 is a circuit block diagram showing an audio-video signal transceiving processing device according to an embodiment of the invention.

Please refer to FIG. 2 which is a circuit block diagram of an embodiment of the AV signal transceiving processing device according to the invention. In FIG. 2, the AV signal transceiving processing device 20 includes an AV decoder 21, a bridge 22, a bus interface 23 and tuners 25 and 26. In this embodiment, the bus interface 23 could be PCMCIA, CardBus, or Express Card bus interface.

The tuner 25 is used to receive an analog TV signal T from antenna or cable, and output an analog video signal Va and an analog audio signal Aa when tuned. The tuner 26 is used to receive an analog frequency modulation (FM) broadcasting signal B from antenna or cable, and output an analog broadcasting signal Aab when tuned.

The AV decoder 21 is used to receive the analog broadcasting signal Aab, and output a digital broadcasting signal Adb to the bridge 22 accordingly. Furthermore, the AV decoder 21 receives the analog video signal Va and the corresponding analog audio signal Aa, and outputs a digital video signal Vd and a digital audio signal Ad to the bridge 22 accordingly, wherein the analog audio signal Aa can includes an analog right channel audio signal and an analog left channel audio signal. In one embodiment, the AV decoder 21 can decode the analog audio signal Aa to at least an analog right channel audio signal and an analog left channel audio signal. Subsequently, the AV decoder 21 converts the decoded analog right channel audio signal and the analog left channel audio signal into a digital right and left channel signal AdLR, and outputs the AdLR to the bridge 22.

The bridge 22 is used to receive the digital broadcasting signal Adb and/or the digital video signal Vd and the corresponding digital audio signal Ad, which are outputted from the AV decoder 22, and convert the received signals into the digital broadcasting signal Adb, which is compliant to the bus interface standard of the bus interface 23, and/or a digital video signal Vd and a digital audio signal Ad, which are compliant to a bus interface standard, and outputs the compliant signals to the computer 24 through the bus interface 23, wherein the computer 24 could be a desktop computer, a notebook computer, a laptop computer or a handheld computer. It is better applied to a notebook computer, and for the bus interface standard such as PCMCIA, CardBus or Express Card bus interface standard. The computer 24 receives and encodes the digital video signal Vd and the corresponding digital audio signal Ad, and outputs a digital AV signal, such as Mpeg2 AV signal, accordingly. At this moment, the computer 24 can store or play the encoded digital AV signal, and furthermore, the computer 24 can receives and stores or plays the digital broadcasting signal Adb from the bus interface 23.

The above-mentioned description is for the situation when the signal source is an analog source. The analog signals must be converted into digital signals by the AV decoder 21. However, if the signal source is digital, such as digital AV signal D and/or digital broadcasting signal E, it does not need the decoding of the AV decoder 21, so the AV signal transceiving processing device 20 uses the bridge 22 to directly receive the digital AV signal D and/or the digital broadcasting signal E, wherein the digital AV signal D can be a transport stream (TS) AV signal, a Mpeg2 AV signal, or any other type of digital signal, such as any compressed digital AV signals. The bridge 22 converts the received digital AV signal D and/or the digital broadcasting signal E into digital signal AV signal D and/or the digital broadcasting signal E compliant to the bus interface standard, and then outputs them to the computer 24 through the bus interface 23. Subsequently, the computer 24 can store or play the received digital AV signal D and/or digital broadcasting signal E.

The AV decoder 21 can receive an analog video signal and a corresponding analog audio signal from an analog AV outputting device, which can be a video game player, a digital camera, a digital video recorder, a VCR, a VCD player or a DVD player, wherein the analog video signal outputted from the analog AV outputting device can be an analog S video signal Vas or an analog V video signal Vav. The analog audio signal corresponding to the analog S video signal Vas or the analog V video signal Vav includes at least an analog right channel audio signal AaR and an analog left channel audio signal AaL. The AV decoder 21 decodes the received analog right channel audio signal AaR and the analog left channel audio signal AaL, and outputs a digital left and right channel audio signal AdLR to the bridge 22 accordingly. Furthermore, the AV decoder 21 decodes the received analog S video signal Vas or the analog V video signal Vav, and outputs a digital S video signal Vds or a digital V video signal Vdv to the bridge 22 accordingly. The bridge 22 converts the received digital left and right audio signal AdLR, the digital S video signal Vds or the digital V video signal Vdv into signals that are compliant to the bus interface standard of the bus interface 23, and outputs the signals to the computer 24 through the bus interface 23. Finally, the computer can store or play the received digital left and right audio signal AdLR, digital S video signal Vds or digital V video signal Vdv after processing them.

However, for those who are skilled in the art understand the techniques of the invention should know that the above description is not the limit of the invention. For example, the AV decoder 21 can also include a video decoding unit, and an audio analog-to-digital converting unit, wherein the video decoding unit is used to receive all the analog video signals, and output the corresponding digital signals to the bridge 22. The audio analog-to-digital converting unit is used to receive all the analog audio signals or analog broadcasting signals, and output the corresponding digital audio signals or digital broadcasting signals to the bridge 22.

The bandwidth of the bus interface adopted in the embodiment of the invention, such as PCMCIA, CardBus, or Express Card bus interface, is large and transfer speed is fast, so that the bus interface 23 can output the raw data, such as digital video signals, digital audio signals, digital AV signals, and digital broadcasting signals, to the computer 24 smoothly without transmission delay. Furthermore, the computer 24 can use its computation ability to compress and encode the received digital video signals and digital audio signals into digital AV signals. The high speed computational ability of the computer 24 is fully exploited. Consequently, the number of hardware components in the AV signal transceiving processing device 20 can be reduce, so does the manufacturing cost.

The design of the AV signal transceiving processing device described in the above embodiment decodes the received analog video and analog audio signals into digital video signals and digital audio signals and outputs them to the computer, fully exploits the high speed transmission ability for raw data by the PCMCIA/CardBus/Express Card bus interface, and the high computational ability, which compresses and encodes digital video/audio signals into digital AV signals, of the computer. Consequently, the number of hardware components required for the invention is reduced, and the manufacturing cost is greatly decreased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An audio-video (AV) signal transceiving processing device, comprising:
    an AV decoder for receiving an analog video signal and a corresponding analog audio signal, and outputting a first digital audio signal and a corresponding first digital audio signal; and
    a bridge for receiving the first digital video signal and the first audio signal and outputting a second video signal and a second audio signal, which are compliant to a bus interface standard, to a computer through a bus interface compliant to the bus interface standard;
    wherein the bus interface is a PCMCIA, CardBus or Express Card bus interface.

2. The AV signal transceiving processing device according to claim 1, wherein the computer encodes the received second video signal and the second audio signal into a third digital AV signal.

3. The AV signal transceiving processing device according to claim 2, wherein the third digital AV signal is a Mpeg2 AV signal.

4. The AV signal transceiving processing device according to claim 1, wherein the AV decoder decodes the received analog audio signal into at least an analog right channel audio signal and an analog left channel audio signal, and the AV decoder converts the analog right channel audio signal and the analog left channel audio signal into a digital left and right channel audio signal which is then outputted to the bridge.

5. The AV signal transceiving processing device according to claim 1, wherein the AV signal transceiving processing device further comprises:
    a tuner for receiving an analog television (TV) AV signal, and outputting the analog video signal and the analog audio signal to the AV decoder when tuned.

6. The AV signal transceiving processing device according to claim 1, wherein the analog video signal is an analog S video signal, and the analog audio signal includes at least an analog right channel audio signal and an analog left channel audio signal, both of which correspond to the analog S video signal.

7. The AV signal transceiving processing device according to claim 1, wherein the analog video signal is an analog V video signal, and the analog audio signal includes at least an analog right channel audio signal and an analog left channel audio signal, both of which correspond to the analog V video signal.

8. The AV signal transceiving processing device according to claim 1, wherein the bridge can also receive a fourth digital AV signal from a digital signal source, which is different to the AV decoder, and convert the fourth digital AV signal into a fifth digital AV signal, which is compliant to the bus interface standard, that is then outputted to the computer through the bus interface.

9. The AV signal transceiving processing device according to claim 8, wherein the fourth digital AV signal includes a transport stream (TS) AV signal, a Mpeg2 AV signal, or any other types of digital AV signal.

10. The AV signal transceiving processing device according to claim 1, wherein the bridge can also receive a first digital broadcasting signal from a digital signal source different to the AV decoder, and convert the first digital broadcasting signal into a second digital broadcasting signal, which is compliant to the bus interface standard, that is the outputted to the computer through the bus interface.

11. The AV signal transceiving processing device according to claim 1, wherein the AV decoder can also receive an analog broadcasting signal and output a digital broadcasting signal to the bridge accordingly.

12. The AV signal transceiving processing device according to claim 11, wherein the AV signal transceiving processing device further comprises:
    a tuner for receiving an analog frequency modulation (FM) broadcasting signal and outputting the analog broadcasting signal when tuned.

13. The AV signal transceiving processing device according to claim 1, wherein the computer is a desktop computer or a notebook computer.

14. The AV signal transceiving processing device according to claim 1, wherein the analog audio signal includes an analog left channel audio signal and an analog right channel audio signal.

15. An audio-video (AV) signal transceiving processing device comprising a bridge for receiving a first digital AV signal and converting the first digital AV signal into a second digital AV signal, which is compliant to a bus interface standard, wherein the second digital AV signal is then outputted to a computer through a bus interface compliant to the bus interface standard, wherein the bus interface is a PCMCIA, CardBus or Express Card bus interface.

16. The AV signal transceiving processing device according to claim 15, wherein the first digital AV signal includes a transport stream AV signal, a Mpeg2 AV signal, or any other type of digital AV signal.

17. The AV signal transceiving processing device according to claim 15 wherein the computer is a desktop computer or a notebook computer.

18. An audio-video (AV) signal transceiving processing device comprising a bridge for receiving a first digital broadcasting signal and converting the first digital broadcasting signal into a second digital broadcasting signal, which is compliant to a bus interface standard, wherein the second digital broadcasting signal is then outputted to a computer through a bus interface compliant to the bus interface standard, wherein the bus interface is a PCMCIA, CardBus or Express Card bus interface.

19. The AV signal transceiving processing device according to claim 18 wherein the computer is a desktop computer or a notebook computer.

* * * * *